United States Patent
Moilanen et al.

(10) Patent No.: US 10,434,521 B2
(45) Date of Patent: Oct. 8, 2019

(54) DIFFERENTIAL FLOTATION OF SULFIDE ORES FOR RECOVERING REFRACTORY GOLD

(71) Applicant: OUTOTEC (FINLAND) OY, Espoo (FI)

(72) Inventors: Jari Moilanen, Espoo (FI); Jaakko Leppinen, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/766,248

(22) PCT Filed: Oct. 12, 2016

(86) PCT No.: PCT/FI2016/050713
§ 371 (c)(1),
(2) Date: Apr. 5, 2018

(87) PCT Pub. No.: WO2017/064369
PCT Pub. Date: Apr. 20, 2017

(65) Prior Publication Data
US 2018/0280992 A1    Oct. 4, 2018

(30) Foreign Application Priority Data
Oct. 13, 2015    (FI) ...................... 20155726

(51) Int. Cl.
*B03D 1/01*    (2006.01)
*B03D 1/06*    (2006.01)
(Continued)

(52) U.S. Cl.
CPC ............ *B03D 1/06* (2013.01); *B03D 2201/06* (2013.01); *B03D 2203/025* (2013.01); *C01G 7/00* (2013.01); *C22B 11/00* (2013.01)

(58) Field of Classification Search
CPC ........ B03D 1/06; B03D 1/02; B03D 2201/06; B03D 2203/025; C22B 11/00; C01G 7/00
(Continued)

(56) References Cited

U.S. PATENT DOCUMENTS 2,342,277 A * 2/1944 Herkenhoff ............ B03D 1/002
                                                         209/167
5,171,428 A * 12/1992 Beattie ................... B03D 1/002
                                                         209/166
6,210,648 B1   4/2001 Gathje et al.

FOREIGN PATENT DOCUMENTS

FR    2620353 A1 *  9/1987
GR    1001483 B  *  2/1994
(Continued)

OTHER PUBLICATIONS

Finnish Search Report issued by the Finnish Patent and Registration Office in relation to Finnish Patent Application No. 20155726 dated Apr. 18, 2016 (1 page).
(Continued)

*Primary Examiner* — Thomas M Lithgow
(74) *Attorney, Agent, or Firm* — Robert P. Michal, Esq.; Carter, DeLuca & Farrell LLP

(57) ABSTRACT

A process for recovery of gold from gold-containing raw materials includes obtaining gold-containing raw material having refractory gold-containing sulfidic minerals including a first type of refractory sulfidic mineral having high gold content and a second type of sulfidic mineral having low gold content; forming a mineral pulp including a first type of refractory sulfidic mineral particles having high gold content and second type of sulfidic mineral particles having low gold content by suspending ground gold-containing material in water and optionally further milling the material; conditioning the mineral pulp by addition of a surface modifying chemical to obtain a conditioned pulp; subjecting
(Continued)

the conditioned pulp to a froth flotation process; recovering the non-floatable first type of refractory sulfidic mineral particles having high cold content as flotation tailings; pressure oxidizing (POX) the flotation tailings to obtain a discharge slurry comprising liberated gold; and recovering gold from the discharge slurry.

17 Claims, 2 Drawing Sheets

(51) Int. Cl.
  *C22B 11/00* (2006.01)
  *C01G 7/00* (2006.01)
(58) Field of Classification Search
  USPC .......................................................... 209/166
  See application file for complete search history.

(56) References Cited

FOREIGN PATENT DOCUMENTS

WO   WO-2013/110757 A1   8/2013
WO   WO-2014/179134 A1   11/2014

OTHER PUBLICATIONS

Tuteja R K et al, "Studies on differential flotation characteristics of arsenopyrite/pyrite concentrate", Proceedings of the International Conference on Extractive Metallurgy of Gold and Base Metals, (Jan. 1, 1992), pp. 217-219, XP009193226 [Y] 1-17 * p. 217.

Weir D Robert et al, "Refractory Gold: The Role of Pressure Oxidation", Gold 100, Proceedings of the International Conference on Gold,, (Jan. 1, 1986), vol. 2, pp. 275-285, XP009193223 [Y] 1-17 * p. 276 *.

Y. Liu et al, "Flotation separation of carbonate from sulfide minerals, I: flotation of single minerals and mineral mixtures", Minerals Engineering., GB, (Jan. 1, 2004), vol. 17, No. 7-8, doi:10.1016/j.mineng.2004.03.006, ISSN 0892-6875, pp. 855-863, XP055338121 [A] 1-17 * p. 856 *.

Connor et al, "0892-6875(94)E0028-A The Flotation of Gold Bearing Ores—A Review", Minerals Engineering, (Jan. 1, 1994), pp. 839-849, URL: http://ac.els-cdn.com/0892687594901287/1-s2.0-0892687594901287-main.pdf?_tid=40b37b30-e231-11e6-bfba-00000aab0f01&acdnat=1485261364_ad225f68676bb71a56000b892cede617, XP055338300 [A] 1-17 * p. 843 *.

K. A. Kydros et al, "Processing an Auriferous Pyrite Concentrate in the Presence of Reducing Agents", Canadian Metallurgical Quarterly, CA, (Jan. 1, 1995), vol. 34, No. 1, doi:10.1179/cmq.1995.34.1.15, ISSN 0008-4433, pp. 15-20, XP055338385 [A] 1-17 * p. 15-16.

International Search Report issued by the European Patent Office acting as the International Searching Authority in relation to International Application No. PCT/FI2016/050713 dated Feb. 2, 2017 (3 pages).

Written Opinion of the International Searching Authority issued by the European Patent Office acting as the International Searching Authority in relation to International Application No. PCT/FI2016/050713 dated Feb. 2, 2017 (6 pages).

International Preliminary Report on Patentability issued by the European Patent Office acting as the International Preliminary Examining Authority in relation to International Application No. PCT/FI2016/050713 dated Nov. 29, 2017 (7 pages).

* cited by examiner

DIFFERENTIAL FLOTATION OF SULFIDE ORES FOR RECOVERING REFRACTORY GOLD

CROSS-REFERENCE TO RELATED APPLICATIONS

This application is a national phase entry under 35 U.S.C. 371 of PCT International Application No. PCT/FI2016/050713 filed Oct. 12, 2016, which claims priority to Finnish Patent Application No. 20155726, filed Oct. 13, 2015, the disclosure of each of these applications is expressly incorporated herein by reference in their entirety.

FIELD OF THE INVENTION

The present invention relates to recovery of gold from materials comprising refractory gold-containing minerals and more particularly to a method of beneficiating gold-containing materials comprising refractory gold-containing sulfidic minerals prior to gold leaching for increasing concentration of leachable gold in the gold-containing material.

BACKGROUND OF THE INVENTION

Currently gold-containing materials such as gold ores and concentrates are almost exclusively subjected to cyanide leaching for recovery of gold. However, in non-free-milling gold-containing materials such as refractory ores and concentrates gold particles are in locked within a matrix, most commonly sulfidic minerals, and cyanide solution cannot break up the sulfide structures such as pyrite ($FeS_2$) and/or arsenopyrite (FeAsS). Thus pretreatment is necessary to decompose the mineral structure to liberate gold for subsequent recovery. Typically gold-containing refractory sulfidic materials is preprocessed before leaching by pressure oxidation (POX) to facilitate the recovery of gold at economic scale. There are also processes recovering gold using halide media from sulfidic or other gold-containing materials. However, presence of refractory sulfidic materials decreases gold recovery also in these processes.

In pressure oxidation sulfidic minerals are oxidized exposing encapsulated gold and liberating it into solution for subsequent recovery by leaching. The POX process takes place in an autoclave in harsh conditions at high temperature and high pressure. The cost of such autoclave equipment is high and often the autoclave capacity limits the processing capacity of the gold processing plant.

To maintain the heat and acid balance the POX process also requires certain sulfur content in the treated material. The sulfur content can be adjusted before the POX processing by processing all or part of the material in a sulfide flotation process where material having low sulfur content is removed as flotation tailings and the flotation concentrate is reported to the POX.

WO2013110757A1 discloses a method for enrichment of metal sulfide ores in desired minerals in cases where the ores have sulfide-containing gangues by addition of an oxidant to slurries prepared from the ores during or immediately prior to froth flotation without any conditioning of the pulp.

U.S. Pat. No. 6,210,648 B1 discloses a method for flotation of refractory auriferous sulfides using an oxygen-deficient flotation gas for a non-selective flotation of different iron-containing sulfide mineral species prior to POX. The method promotes the flotation of the refractory auriferous sulfides and claims to enhance separation of sulfide minerals, including refractory auriferous sulfides, from non-sulfide gangue material. The flotation concentrates are recovered from the flotation froth enriched in sulfide minerals. However, the method does not allow selective separation of sulfidic minerals from each other.

BRIEF DESCRIPTION OF THE INVENTION

It is thus an object to provide a method and an apparatus for implementing the method so as to alleviate the above disadvantages. The objects of the invention are achieved by a method and a process, which are characterized by what is stated in the independent claims. The preferred embodiments of the invention are disclosed in the dependent claims.

The surface modifying froth flotation is based on selective modification of the surface of the reactive sulfidic mineral particles having high gold content. This may be achieved by adjusting the electrochemical potential of the froth flotation process to a level where the surfaces of the reactive sulfidic mineral particles are chemically modified rendering the reactive sulfidic mineral particles having high gold content hydrophilic and non-floatable while the non-reactive sulfidic mineral particles having low gold content remain hydrophobic. Modification of the surface of the particle can be attained by addition of a surface modifying chemical such as oxidizing or reducing agent or by other chemical means.

It is an advantage of the present method is that when material comprising mostly gold-containing sulfidic minerals is processed the POX processing capacity is increased and/or capex costs relating to POX process is reduced.

BRIEF DESCRIPTION OF THE DRAWINGS

In the following the invention will be described in greater detail by means of preferred embodiments with reference to the drawings, in which.

DETAILED DESCRIPTION OF THE INVENTION

Figure 1:
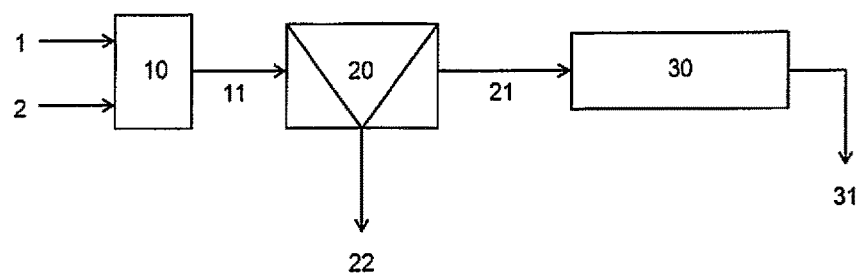
FIG. 1 illustrates as a first example a process flow of a process for recovery of gold from gold-containing raw materials comprising refractory gold-containing minerals.

The present invention is directed to recovery of gold form gold-containing raw materials refractory gold-containing sulfidic minerals. Gold in refractory gold-containing minerals is poorly amenable to leaching making the recovery process utilizing direct cyanidation uneconomical. Typical gold-containing material comprising refractory gold-containing minerals has a gold recovery rate less than 80% when subjected to direct cyanidation. The term "refractory gold-containing material" refers to the presence of gold locking or cyanide consuming materials, particularly sulfidic minerals such as iron sulfides (e.g. pyrite, marcasite, pyrrhotite), arsenic sulfides (e.g. arsenopyrite, orpiment, realgar), copper sulfides (e.g. chalcopyrite), antimony sulfides (e.g. aurostibnite, stibnite), tellurides, elemental sulfur, or any mixture thereof.

Said gold-containing raw material typically comprises less than 80% w/w, in particular less than 50% w/w, preferably less than 35% w/w, more preferably less than 25% w/w, even more preferably 10 to 0% w/w native gold of the total gold in the said raw material, the total gold comprising native gold and gold locked in the raw material, in particular in sulfidic minerals. The term "native gold" refers to free-milling gold as opposite to gold locked in the material, in particular sulfidic minerals such as iron sulfides (e.g. pyrite). Typically said refractory gold-containing raw material is or is derived from ore or concentrate wherein the main mineral is pyrite or arsenopyrite. In addition to gold and sulfur, the said raw material may further comprise other elements such as silver, copper, nickel, cobalt, zinc, iron, lead, aluminum, and/or silicon.

Such gold-containing refractory raw material comprises 1) a first type of refractory sulfidic minerals having high gold content and 2) a second type of refractory sulfidic minerals having low gold content. It has been surprisingly realized that there is marked difference the chemical reactivity of said first type of refractory sulfidic minerals having high gold content and said second type of refractory sulfidic minerals having low gold content although said first type and said second type of sulfidic minerals are to be classified within a single species of refractory sulfidic minerals, e.g. pyrite. The first type of refractory sulfidic minerals having high gold content appears to have reactive surface while the second type of refractory sulfidic minerals having low gold content appears to have non- or less-reactive surface. As gold is in particular associated with the reactive sulfidic minerals it is desirable to be able to separate the different types of the refractory sulfidic minerals to improve the quality of the POX processes material. The present process is based on selective modification of the surfaces of the reactive refractory sulfidic mineral particles having high gold content thus making the said particles non-floatable.

For example gold bearing pyrite varies in mineral morphology, in particular surface area of the sulfidic mineral. Reactive pyrite having high gold content is typically present in the raw material as microcrystalline pyrite, whereas non-reactive pyrite having low gold content is present as coarse pyrite.

The gold content of the reactive sulfidic minerals having high gold content is higher than the gold content of the non-reactive sulfidic minerals having low gold content. In particular the gold content of the reactive sulfidic minerals having high gold content is above 5 pm, preferably above 8 ppm, more preferably between 10 to 100 ppm. Further in particular the gold content of the non-reactive sulfidic minerals having low gold content is below 5 ppm, preferably below 1 ppm, more preferably between 0 to 0.1 ppm.

Accordingly provided herein is a process for recovery of gold form gold-containing raw materials comprising refractory gold-containing minerals, in particular gold-containing refractory sulfidic minerals, comprising (a) obtaining gold-containing raw material comprising refractory gold-containing sulfidic minerals comprising first type of refractory sulfidic mineral having high gold content and second type of sulfidic mineral having low gold content;

(b) forming a mineral pulp comprising first type of refractory sulfidic mineral particles having high gold content and second type of sulfidic mineral particles having low gold content by suspending ground gold-containing material in water and optionally further milling the material;

(c) conditioning the mineral pulp by addition of a surface modifying chemical for modifying the surface of the first type of refractory sulfidic mineral particles having high content thus making the said particles non-floatable to obtain a conditioned pulp;

(d) subjecting the conditioned pulp to a froth flotation process to separate first type of refractory sulfidic mineral particles having high gold content from the second type of sulfidic mineral particles having low gold content;

(e) recovering the non-floatable first type of refractory sulfidic mineral particles having high cold content as flotation tailings;

(f) pressure oxidizing (POX) the flotation tailings recovered in step (e) to obtain a discharge slurry comprising liberated gold; and (g) recovering gold from the discharge slurry obtained in step (f).

FIG. 1 is illustrates a first example of a process for the recovery of gold from gold-containing raw materials comprising refractory gold-containing minerals. Referring to FIG. 1, gold-containing refractory raw material comprising 1) a first type of refractory sulfidic mineral having high gold content i.e. "reactive refractory sulfidic mineral" and 2) a second type of refractory sulfidic mineral having low gold content i.e. "non-reactive refractory sulfidic mineral", typically provided as ground ore, is mixed with water to form a mineral pulp 1. Said mineral pulp comprising reactive refractory sulfidic mineral particles having high gold content and non-reactive sulfidic mineral particles having low gold content is subjected to a conditioning phase 10 wherein the reactive refractory sulfidic mineral particles are deactivated i.e. rendered aerophobic and non-reactive to flotation chemicals by addition of a surface modifying chemical 2, which modifies the surface of the reactive sulfidic mineral particles. Deactivation of the reactive refractory sulfidic mineral particles thus renders said particles non-floatable while the non-reactive sulfidic mineral particles which do not interact or react with the surface modifying chemical 2 remain floatable. The deactivation of the first type of sulfidic mineral particles having high gold content accordingly prevents enrichment of gold in froth in the following selective sulfidic mineral forth flotation phase 20, and allows selective removal of second type of sulfidic mineral particles having low gold content.

For allowing deactivation of the reactive sulfidic mineral particles before the flotation phase, the conditioning phase 10 is performed before selective sulfidic mineral froth flotation phase 20. Preferably the surface modifying chemical 2 is added at least 2 minutes before initiation of the selective sulfidic mineral flotation phase 20. For enhanced selectivity, the surface modifying chemical 2 is added at least 5 minutes before initiation of the flotation phase 20. As under extended exposure to the surface modifying chemical 2 also some of the second type of sulfidic mineral particles having low gold content may become deactivated and thus made less readily floatable, the duration of the conditioning phase 10 preferably does not exceed 30 min, more preferably 15 min, even more preferably 10 min. However, the desirable duration of the conditioning phase 10 is dependent on the relative nature of the first type and second type of sulfidic mineral particles and even longer duration of the condition phase 10 may be tolerable.

The conditioning phase 10 is preferably performed in an agitated reactor referred herein as "a deactivation reactor".

The surface modification of the reactive pyrite minerals having high gold content is attained in the conditioning phase 10 by introduction of a surface modifying chemical 2. Desirable amount of the surface modifying chemical is dependent on the surface area of reactive pyrite and the amount of other minerals consuming the surface modifying chemical 1. Preferably the amount of the surface modifying chemical 1 is 50 to 500 g/t of treated ore. Preferably the surface modifying chemical 2 is selected from a group consisting of nitrogen, oxidizing agents, reducing agents, complexing agents and any mixtures thereof.

In a particular example, modifying the surface of the reactive sulfidic mineral particles making the said particles non-floatable is accomplished by oxidizing the surfaces of the reactive sulfidic mineral particles by dosing of an oxidizing agent. Preferably said oxidizing agent is selected from a group consisting of hydrogen peroxide, oxygen, ozone, alkali permanganate, chlorine, bromine, sulfuric acid, and any mixtures thereof. More preferably said oxidizing agent is hydrogen peroxide. The suitable amount of the oxidizing agent is dependent on the surface area of reactive pyrite and the amount of other minerals consuming the oxidizing agent in the selected condition such as electrochemical potential. Preferably the amount of the oxidizing agent is 50 to 500 g/t of treated ore.

In an alternative example, modifying the surface of the reactive sulfidic mineral particles making the said particles non-floatable is accomplished by reducing the surfaces of the reactive sulfidic mineral particles by dosing of a reducing agent. Preferably said reducing agent is selected from a group consisting of hydrogen, carbon monoxide, sodium sulfide, sodium hydrosulfide, sodium dithionite, sulfur dioxide, ferrous sulfate, Fe powder, Zn powder, and any mixtures thereof. The suitable amount of the reducing agent is dependent on the surface area of reactive pyrite and the amount of other minerals consuming the reducing agent in the selected condition such as electrochemical potential. Preferably the amount of the reducing agent is 50 to 500 g/t of treated ore.

In an alternative example, modifying the surface of the reactive sulfidic mineral particles making the said particles non-floatable is accomplished by modifying the surfaces of the reactive sulfidic mineral particles by dosing of a complexing agent. Preferably said complexing agent is selected from a group consisting of ethylenediaminetetraacetic acid (EDTA), diethylenetriamine (DETA), alkali cyanide, ammonia, alkali chloride, and any mixtures thereof. The suitable amount of the complexing agent is dependent on the surface area of reactive pyrite and the amount of other minerals consuming the complexing agent in the selected condition such as electrochemical potential. Preferably the amount of the complexing agent is 50 to 500 g/t of treated ore.

After conditioning phase 10 has been finished the conditioned pulp 11 comprising deactivated first type of refractory mineral particles is subjected to the selective sulfidic mineral froth flotation phase 20. The conditioned pulp 11 is introduced to tanks known as flotation cells that are aerated to produce bubbles. Any aerophilic and/or hydrophobic particles attach to the gas bubbles, which rise to the surface forming a froth. In the selective sulfidic mineral froth flotation phase 20 the non-reactive sulfidic mineral particles remaining or are rendered aerophilic by optional addition of one or more of a surfactant, a frother, or a collector chemical and separation is achieved by passing air bubbles through the conditioned slurry. The undesirable second type of refractory sulfidic mineral particles having low gold content adhere to the air bubbles forming a froth floating on the surface of the pulp.

The forth is removed as a flotation overflow 22 and the first type of refractory sulfidic mineral particles having high remain in the pulp together with any gangue mineral unresponsive to the froth flotation and can be recovered in as the flotation underflow 21 the form of a mineral pulp, i.e. flotation tailings.

The flotation tailings 21 are then subjected to a pressure oxidation phase 30, wherein under conditions known to a skilled person, the sulfidic minerals are oxidized exposing encapsulated gold and liberating it into solution. Gold can then be recovered from the thus obtained discharge slurry 31 comprising liberated gold by conventional methods known to a person skilled in the art, for example by leaching.

Gold containing raw materials typically comprise also silicates in addition to gold bearing minerals. If desired, these silicates may be removed from the mineral pulp prior to pressure oxidation phase 30. Removal of the silicates can be performed either before separation of the first type and second type of sulfidic minerals or after it.

Figure 2:
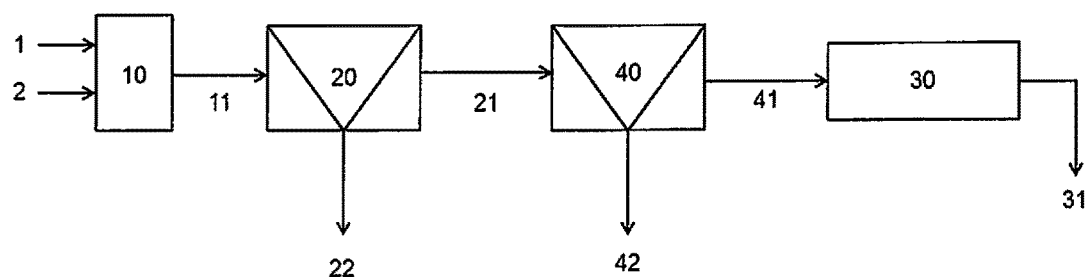
FIG. 2 illustrates as a second example a process flow of a process for recovery of gold from gold-containing raw materials comprising refractory gold-containing minerals.

FIG. 2 illustrates as a second example a process for recovery of gold from gold-containing raw materials comprising refractory gold-containing minerals wherein silicates are removed by flotation after separation of the reactive and non-reactive sulfidic minerals by conditioning 10 and selective sulfide froth flotation 20. In FIG. 2 like components are designated by the same reference numerals as used in FIG. 1.

As already discussed in connection of FIG. 1, mineral pulp 21 comprising second type of sulfidic minerals having high gold content has been recovered as flotation tailings from the selective sulfidic mineral flotation phase 20. In the example presented in FIG. 2, the mineral pulp 21 is subsequently subjected to a silicate flotation phase 40 before it is subjected to pressure oxidation phase 30.

The silicate flotation phase 40 can be performed by any conventional method known to a person skilled in art. In silicate flotation phase 40 silicates are floated rendering a silicate-depleted mineral pulp 41 comprising sulfidic minerals having high gold content depleted of silicates as the flotation tailing i.e. flotation underflow and the silicates are removed as the overflow 42 of the flotation phase. After this further beneficiation phase, the obtained silicate-depleted mineral pulp 41 is then subjected to pressure oxidation as discussed in context of FIG. 1.

Figure 3:
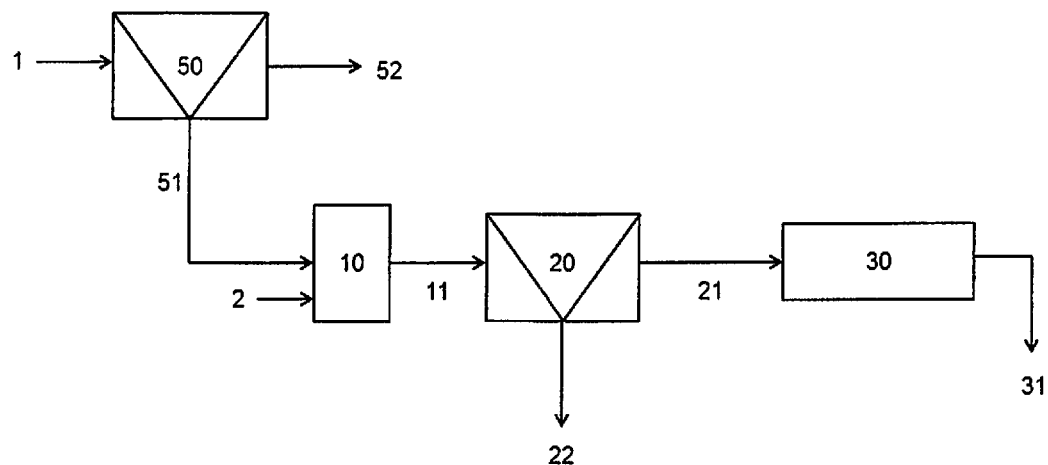
FIG. 3 illustrates as a third example a process flow of a process for recovery of gold from gold-containing raw materials comprising refractory gold-containing minerals.

FIG. 3 illustrates as a third example a process for recovery of gold from gold-containing raw materials comprising refractory gold-containing minerals wherein the silicates are removed by bulk sulfide flotation of sulfidic mineral particles before separation of the first type and the second type of sulfidic mineral particles by conditioning 10 and selective sulfide froth flotation 20. In FIG. 3 like components are designated by the same reference numerals as used in FIG. 1 and/or FIG. 2.

Referring to FIG. 3, gold-containing raw material, typically ground ore, is mixed with water to form a mineral pulp 1. Said mineral pulp is subjected to a bulk sulfide flotation phase 50, wherein sulfidic minerals are floated and thus separated from silicates.

The bulk sulfide flotation phase 50 can be performed by any conventional method known to a person skilled in art, rendering a pre-treated mineral pulp 51 depleted of silicates and comprising both first type of refractory sulfidic mineral particles having high gold content and second type of refractory sulfidic mineral particles having low gold content as the overflow. The silicates are depressed and removed as the underflow 52 of the silicate flotation phase 50. After this bulk sulfide flotation phase 50, the pre-treated mineral pulp 51 is then subjected to a conditioning phase 10 and a selective sulfidic mineral flotation phase 20, followed by a pressure oxidation phase 30, as discussed in context of FIG. 1.

Figure 4:
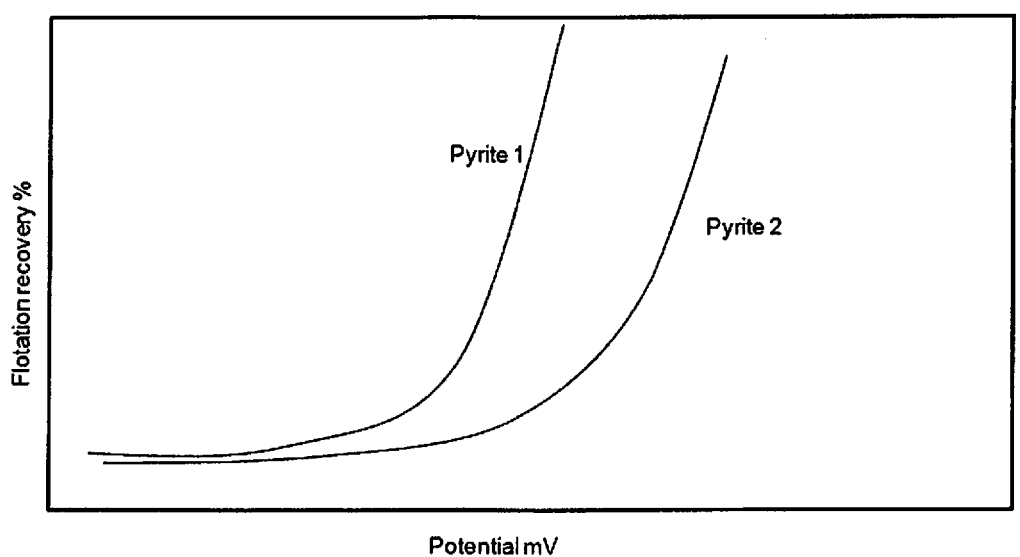
FIG. 4 illustrates flotation recovery rate of different types of sulfidic pyrite minerals as a factor to electropotential of the flotation pulp.

FIG. 4 illustrates exemplary flotation recovery rate of different types of sulfidic pyrite minerals as a factor to electropotential of the flotation slurry. Pyrite 1 illustrates recovery of reactive pyrite minerals having high gold content and Pyrite 2 illustrates recovery of non-reactive pyrite minerals having low gold content. As can be seen from the FIG. 2, when the conditions of the flotation slurry are kept at the desired range mainly Pyrite 1 is recovered indicating that in these conditions only the surfaces of the reactive sulfidic mineral particles are modified thus rendering the said particles non-floatable while surfaces of Pyrite 2 remain unmodified and can be removed by flotation.

It will be obvious to a person skilled in the art that, as the technology advances, the inventive concept can be implemented in various ways. The invention and its embodiments are not limited to the examples described above but may vary within the scope of the claims.

The invention claimed is:

1. A process for recovery of gold from gold-containing raw materials comprising refractory gold-containing minerals, in particular gold-containing refractory sulfidic minerals, comprising:
    (a) obtaining gold-containing raw material comprising refractory gold-containing sulfidic minerals comprising a first type of refractory sulfidic mineral having high gold content and a second type of sulfidic mineral having low gold content, the first type and the second type of sulfidic minerals are to be classified within a single type of refractory sulfidic minerals, wherein the gold-containing raw material comprises silicates in addition to the gold bearing minerals;
    (b) forming a mineral pulp comprising the first type of refractory sulfidic mineral particles having high gold content and the second type of sulfidic mineral particles having low gold content by suspending ground gold-containing material in water and optionally further milling the material;
    (c) conditioning the mineral pulp by addition of a surface modifying chemical for modifying the surface of the first type of refractory sulfidic mineral particles having high content thus making the particles non-floatable to obtain a conditioned pulp;
    (d) subjecting the conditioned pulp to a froth flotation process to separate the first type of refractory sulfidic mineral particles having high gold content from the second type of sulfidic mineral particles having low gold content;
    (e) recovering the non-floatable first type of refractory sulfidic mineral particles having high gold content as flotation tailings;
    (f) pressuring oxidizing (POX) the flotation tailing recovered in step (e) to obtain a discharge slurry comprising liberated gold; and
    (g) recovering gold from the discharge slurry obtained in step (f),
    wherein the silicates are removed from the mineral pulp subsequent to the mineral flotation process (d) and prior to the pressure oxidizing process (f) by silicate flotation.

2. The processes as claimed in claim 1, wherein the gold-containing material comprising refractory gold-containing minerals has a gold recovery rate less than 80% when subjected to direct cyanidation.

3. The process as claimed in claim 1, wherein the refractory gold-containing material comprises gold locking or cyanide consuming materials such as iron sulphides, arsenic sulphides, copper sulphides, antimony sulfides, tellurides, elemental sulphur, or any mixture thereof.

4. The process as claimed in claim 1, wherein the gold content of the first type of refractory sulfidic mineral having high gold content is above 5 ppm.

5. The process as claimed in claim 4, wherein the gold content of the first type of refractory sulfidic mineral having high gold content is above 8 ppm.

6. The process as claimed in claim 4, wherein the gold content of the first type of refractory sulfidic mineral having high gold content is between 10 to 100 ppm.

7. The process as claimed in claim 1, wherein the gold content of the second type of refractory sulfidic mineral having low gold content is below 5 ppm.

8. The process as claimed in claim 7, wherein the gold content of the second type of refractory sulfidic mineral having low gold content is below 1 ppm.

9. The process as claimed in claim 7, wherein the gold content of the second type of refractory sulfidic mineral having low gold content is below 0.1 ppm.

10. The process as claimed in claim 1, wherein the surface modifying chemical is selected from a group consisting of nitrogen, oxidizing agents, reducing agents, complexing agents and any mixtures thereof.

11. The process as claimed in claim 10, wherein the surface modifying chemical is an oxidizing agent.

12. The process as claimed in claim 11, wherein the oxidizing agent is selected from a group consisting of hydrogen peroxide, oxygen, ozone and alkali permanganate, chlorine, bromine, sulfuric acid, and any mixtures thereof.

13. The process as claimed in claim 10, wherein the surface modifying chemical is a reducing agent.

14. The process as claimed in claim 13, wherein the reducing agent is selected from a group consisting of hydrogen, carbon monoxide, sodium sulphide, sodium hydrosulfide, sodium dithionite, sulfur dioxide, ferrous sulphate, Fe powder, Zn powder, and any mixtures thereof.

15. The process as claimed in claim 10, wherein the surface modifying chemical is a complexing agent.

16. The process as claimed in claim 15, wherein the complexing agent is selected from a group consisting of ethylenediaminetetra-acetic acid (EDTA), diethylenetri-amine (DETA), alkali cyanide, ammonia, alkali chloride, and any mixtures thereof.

17. The process as claimed in claim 15, wherein the amount of the surface modifying chemical is 50 to 500 g/t of treated ore.

* * * * *